A. YANCEY.
APPARATUS FOR SHELLING CRUSTACEA.
APPLICATION FILED AUG. 10, 1910. RENEWED AUG. 11, 1914.

1,175,037.

Patented Mar. 14, 1916.

WITNESSES

INVENTOR
Arthur Yancey.
ATTORNEYS

UNITED STATES PATENT OFFICE.

ARTHUR YANCEY, OF NEW ORLEANS, LOUISIANA.

APPARATUS FOR SHELLING CRUSTACEA.

1,175,037. Specification of Letters Patent. Patented Mar. 14, 1916.

Application filed August 10, 1910, Serial No. 576,573. Renewed August 11, 1914. Serial No. 856,285.

*To all whom it may concern:*

Be it known that I, ARTHUR YANCEY, a citizen of the United States, residing at New Orleans, in the parish of Orleans and State of Louisiana, have invented certain new and useful Improvements in Apparatus for Shelling *Crustacea;* and I do hereby declare the following to be a full, clear, and exact description of the invention, such as will enable others skilled in the art to which it appertains to make and use the same.

This invention relates to improvements in apparatus for shelling *Crustacea,* and its object is to provide means for collecting the meat in an unbruised and marketable condition. It is done by causing the receiving pans to travel with shell supports described in my former applications, reducing the damage by air currents and the force with which the meat strikes the pan.

The improvements described in the following specification are more succinctly defined in the claims.

Figure 3:
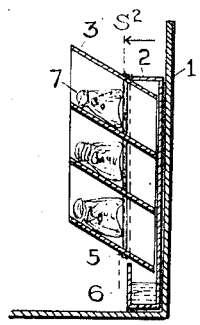
Figure 4:
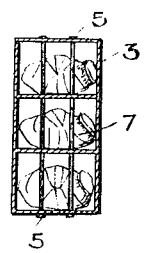
Figure 2:
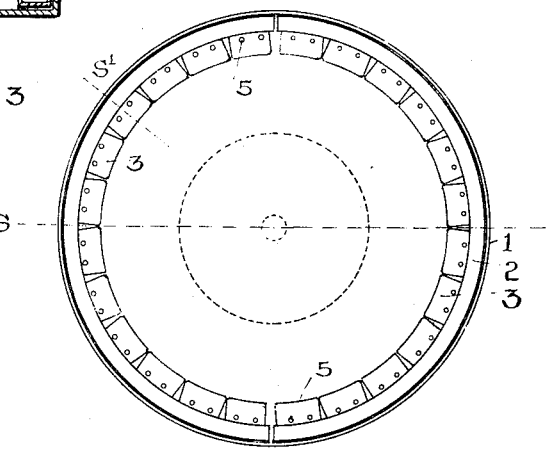
Figure 1:
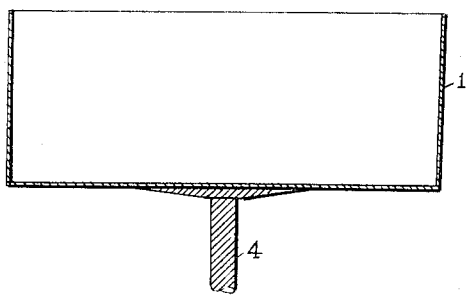

In the drawings, in which like characters designate the same parts in the several views; Figure 1 is a section in elevation as indicated by the dotted line S in Fig. 2 with certain parts, which are shown in the latter, omitted. This represents a centrifugal machine and its spindle. Fig. 2 is an outline view in plan of the centrifugal machine with the shell supports aforesaid and the receiving pans in position. Fig. 3 is an enlarged partial section, indicated by S 1 in Fig. 2, and showing the centrifugal machine, the receiving pan, the shell supports and crab sections placed ready to be shelled. Fig. 4 is a section of the shell holder, as indicated by the dotted line S 2 in Fig. 3, looking in the direction of the arrow. The retaining pins just behind the section have been replaced to illustrate the manner of holding the shells while the meat is being expelled.

1 is a centrifugal retainer, 2 are semicircular receiving pans or receptacles for the meat, 3 are supports or racks for holding the sections of the fish to be shelled. Said rotatable support 3 is provided with a plurality of open ended sections which are divided into an inner and an outer annular series of chambers by the pins 5. Said inner series of chambers receive the pieces 7 of *Crustacea* to be shelled, and retain the shells thereof, and said outer series of chambers receive the meaty matter separated from the shells through the medium of the pins 5.

4 is a spindle for rotating the centrifugal, 5 are the retaining pins which hold the shells, 6 is a cup formed in the pan aforesaid for collecting the juices extracted with the meat from the fish and 7 are portions of fish (crabs) being shelled.

In practice it is well to provide an outer guard for the centrifugal machine, this however has not been shown in the drawing. The bottoms of the shell holders are made inclined to fit the under shell of the fish holding them so that the meat containing lobes are presented substantially radial to the centrifugal retainer and in alinement to the extracting force. The meat is thrown upon and sticks to the bottom or walls of the receiving pans, and is easily removed when the holders are taken with the empty shells from the pans. The circumferential velocity required is about 7,500 feet per minute, and after the crabs have been boiled 25 minutes in an open kettle, not more than 15 seconds revolution at the aforesaid rate of speed is required to extract the meat. The juices are collected in the cup provided for that purpose.

The invention is not limited to the illustrating description.

What I claim is:

1. In an apparatus for shelling *Crustacea,* the combination of a rotatable support having an open ended section; means dividing said section into communicating inner and outer chambers; and a meat collecting receptacle closing the outer end of the outer chamber and rotatable with said support, substantially as described.

2. In an apparatus for shelling *Crustacea,* the combination of a rotatable support having a plurality of radially disposed and open ended sections; means dividing said sections into inner and outer chambers to receive the *Crustacea* and hold the meat separated therefrom respectively; and a meat collecting receptacle fitted over and closing said meat holding chambers and rotatable with said support, substantially as described.

3. In an apparatus for shelling *Crustacea,* the combination of a rotatable support having a plurality of radially disposed and open ended sections; means dividing said sections into inner and outer chambers to receive the *Crustacea* and hold the meat separated therefrom respectively, one wall of said sections being angularly disposed for engaging with the separated meaty matter and breaking the movement thereof incident to centrifugal force; and a meat collecting receptacle fitted over and closing said meat holding chambers and rotatable with said support, substantially as described.

4. In an apparatus for shelling *Crustacea*, the combination of a rotatable support having a plurality of radially disposed and open ended sections; means dividing said sections into inner and outer chambers to receive the *Crustacea* and hold the meat separated therefrom respectively, the upper and lower walls of said sections being downwardly disposed whereby to break the movement of the separated meaty matter incident to centrifugal force; and a meat collecting receptacle fitted over and closing said meat holding chambers and rotatable with said support, substantially as described.

5. In an apparatus for shelling *Crustacea*, the combination of a rotatable support having a plurality of series of superposed, radially disposed and open ended sections; vertically disposed pins dividing each series of said sections into inner and outer chambers to receive the *Crustacea* and hold the meat separated therefrom respectively; the upper and lower walls of said sections being downwardly disposed whereby to break the movement of the separated meaty matter incident to centrifugal force; a meat collecting receptacle fitting over and closing said meat holding chambers, and having a juice holding cup at the bottom thereof; and a retainer supporting and inclosing the support and said receptacle, substantially as described.

In testimony whereof, I affix my signature in presence of two witnesses.

ARTHUR YANCEY.

Witnesses:
   A. BONERELY,
   G. BREWSTER.